UNITED STATES PATENT OFFICE.

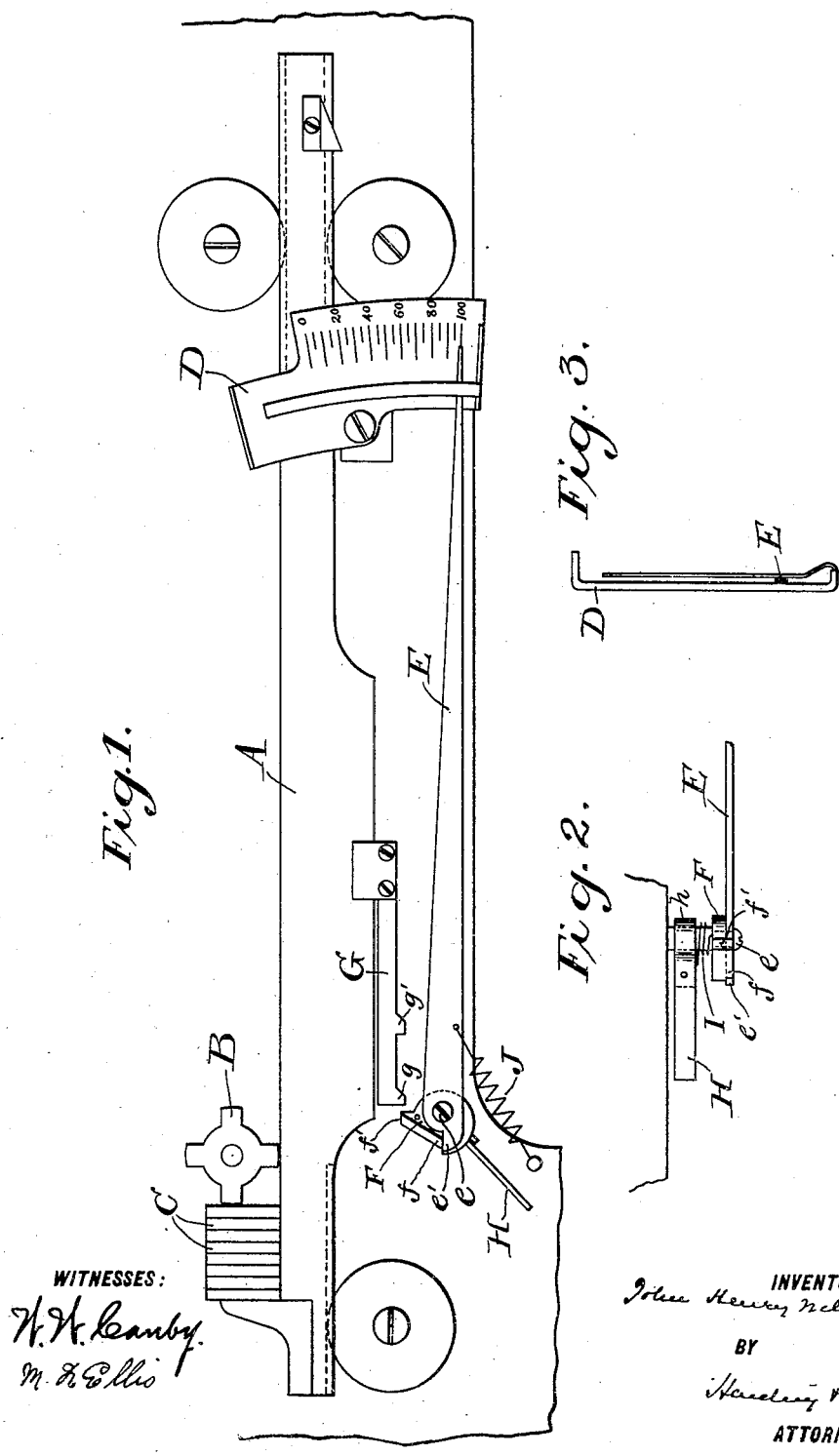

JOHN HENRY WILLIAM KNOOP, OF PHILADELPHIA, PENNSYLVANIA.

ATTACHMENT FOR LINOTYPE-MACHINES.

No. 808,931. Specification of Letters Patent. Patented Jan. 2, 1906.

Application filed October 1, 1904. Serial No. 226,729.

*To all whom it may concern:*

Be it known that I, JOHN HENRY WILLIAM KNOOP, a citizen of the United States, residing at Philadelphia, county of Philadelphia, and State of Pennsylvania, have invented a new and useful Improvement in Attachments for Linotype-Machines, of which the following is a full, clear, and exact description, reference being had to the accompanying drawings, which form a part of this specification.

My invention has for its object to provide magnifying mechanism to indicate in numerical figures corresponding to a combination of numbered matrices an unfinished portion of a line composed of non-compressible or non-expandible matrices and spaces.

Speaking generally, I provide a magnifying indicating-needle, a scale on which one-tenth of an inch is divided into numbered parts, magnified many times, with which said indicating-needle coacts, and a combination of numbered and sized space-matrices corresponding to the numbers on said scale. These combination space-matrices are in some cases partly contained in the machine, but must be substituted in other cases. This depends upon the size of the font—agate, nonpareil, minion, brevier, &c.—used at the time. This arrangement enables an operator to see at once what number of space-matrices or combination of such is required to complete a line or any portion of line of assembled non-compressible or non-expandable matrices and spaces, so as to correspond with a line exactly above or below.

It is of small practical importance to know the exact length of an unfinished line; but it is essential to know what is required to finish it to the exact length desired and to have the means at immediate disposal equal to that of any other matrices required to compose such a line or portion thereof. This is not only advantageous, but absolutely necessary for accurate tabular work to be done on what is known as a "linotype-machine."

I will now describe my invention as shown in the accompanying drawings and then point out the invention in the claims.

In the drawings, Figure 1 is a front view of my invention attached to a section of the frame of a linotype-machine. Fig. 2 is a detail of pivot of indicator-needle. Fig. 3 is a detail of scale and section of indicator-needle.

A represents the assembling-slide of a linotype-machine operated in the usual manner. B is the assembling star-wheel; C, the matrices.

D is the enlarged scale.

E is an indicator pivoted on pin $e$, secured to the frame of machine. This indicator has the projecting piece $e'$.

F is a pawl pivoted on pin $e$ and having a projecting portion $f$, which in one position is in line with projection $e'$. This pawl has also the projection $f'$.

G is a movable frame, of which more than one may be used, secured to the assembling-slide A and having lug $g$, which in one position of the pawl F in the movement of the assembling-slide strikes the projection $f''$, operating the pawl and indicator. A second lug $g'$ may be used in cases where there are two regularly-running tables having different length of stubs, thus making it unnecessary to change the position of frame G, the operator simply ignoring either the first or second movement of indicator.

H is a rod having a strap end $h$ surrounding pin $e$. The strap $h$ slightly clamps the pin $e$, thus retaining the rod H in any desired position moved to by hand.

A spring I around pin $e$ is connected to pawl F and rod H. By operating this rod H the pawl F may be moved in and out of alinement with lug $g$. The object of the spring I is to form a connection between rod H and pawl F and at the same time to permit lug $g$ to pass over projection $f'$ in returning and bring pawl F back into operative position after lug $g$ has passed.

A spring J assists in keeping the assembled matrices close together, insuring accuracy of figures indicated by index-finger.

Operation: In operation when the rod H is moved downward it brings the projection $f'$ of pawl F in line with lug $g$ and simultaneously brings projection $f$ to bear upon projection $e'$. When the line or part of line of assembling-matrices propels the assembling-slide-carrying lug $g$ up to one-tenth of the desired end of said line, lug $g$ will begin to bear against projection $f'$ and cause index-needle to move upward, indicating the matrix or combination of them required to make up the exact length of part of line desired. The scale, dividing one-tenth of an inch into twenty parts enlarged eighteen times, permits, with a combination of five matrices varying .005 of an inch in thickness especially provided and brought into operation in the same manner as every other matrix, a quick vertical alinement, deviating not more than .0025 of an inch. Under normal conditions this is considered perfect. If absolute perfection should be desired, additional space-matrices can be provided.

Having described my invention, I beg to have protected by Letters Patent the following claims:

1. In a linotype-machine, in combination, mechanism to assemble a line of matrices—a magnifying indicating-needle, and intermediate means, especially adapted to operate said indicating-needle.

2. In a linotype-machine, in combination, mechanism to assemble a line of matrices—a magnifying indicating-needle, one or more independent movable projections especially adapted with intermediate mechanism to operate upon said indicating-needle, and carried by said assembling mechanism.

3. In a linotype-machine, in combination, mechanism to assemble a line of matrices—a magnifying indicating-needle, a scale on which a small portion of an inch is divided into a number of enlarged equal parts, these parts being numbered, and these numbers corresponding to one or more space-matrices especially provided.

4. In a linotype-machine, in combination, mechanism to assemble a line of matrices a magnifying indicator, a corresponding scale, a series of space-matrices, especially sized and numbered to correspond with said scale, and to be used in connection therewith.

5. In a linotype-machine, in combination with the assembler-slide, one or more independent movable frames having a projection thereon, especially adapted to act in combination with intermediate mechanism upon a magnifying indicator, a pivoted pawl especially adapted to act, when struck by said projection, upon said indicator, and operatively connected therewith, and means to move said pawl into and out of line of movement of said projection.

6. In a linotype-machine, in combination, a magnifying indicator, a corresponding scale, one or more independent movable frames having a projection carried by said assembler-slide, especially adapted to act upon a pivoted pawl especially provided to act upon said indicating-needle, and a rod adapted to move said pawl into and out of alinement with said movable projection.

7. In a linotype-machine, in combination, an enlarged scale, a magnifying indicator coacting with said scale, a pin on which said indicator is pivoted, a pawl on said pin, operative connection between said pawl and indicator, a rod mounted on said pin, a spring around said pin, connected to said rod and pawl, said rod being especially adapted to move said pawl out of and into alinement with said movable projection.

In testimony of which invention I have hereunto set my hand, at Philadelphia, on this 28th day of September, 1904.

JOHN HENRY WILLIAM KNOOP.

Witnesses:
M. M. HAMILTON,
ALBERT McEVOY.